United States Patent [19]

Pitchford, Jr.

[11] Patent Number: 4,739,578
[45] Date of Patent: Apr. 26, 1988

[54] HUMANE ANIMAL CAPTURING AND RESTRAINING DEVICE

[75] Inventor: Robert L. Pitchford, Jr., Compton, Calif.

[73] Assignee: Inventorpreneur, Inc., Compton, Calif.

[21] Appl. No.: 78,810

[22] Filed: Jul. 28, 1987

[51] Int. Cl.⁴ .............................................. A01M 23/34
[52] U.S. Cl. ...................................................... 43/87
[58] Field of Search ...................................... 43/87, 86

[56] References Cited

U.S. PATENT DOCUMENTS

| | | | |
|---|---|---|---|
| 1,052,320 | 2/1913 | Crain | 43/86 |
| 1,323,400 | 12/1919 | Likaj. | |
| 1,342,425 | 6/1920 | Crago. | |
| 1,900,219 | 3/1933 | Bailey. | |
| 1,913,893 | 6/1933 | Morrill | 43/87 |
| 2,168,132 | 8/1939 | Marshall | 43/87 |
| 3,949,514 | 4/1976 | Ramsey | 43/87 |
| 4,513,527 | 4/1985 | Wicklund | 43/86 |
| 4,581,843 | 4/1986 | Fremont | 43/87 |

*Primary Examiner*—Gene P. Crosby
*Attorney, Agent, or Firm*—Paul H. Ware

[57] ABSTRACT

An animal capturing and restraining device 10 which shall catch and hold an animal so captured, securely without mutilation and without inflicting pain and from which the captured and restrained animal will not effect escape through, for example, the expedient of gnawing a paw off and leaving it in the device. An animal caught by the device will be restrained and prevented from escape by means of an adjustable slip noose 40 comprising flexible member 28 and large loop 30. Relatively small animals may be captured about the body while relatively larger animals will be captured about the neck whereby an uncomfortable adjustment to the noose will be made or relaxed only in direct proportion to any struggles initiated by the animal itself.

9 Claims, 2 Drawing Sheets

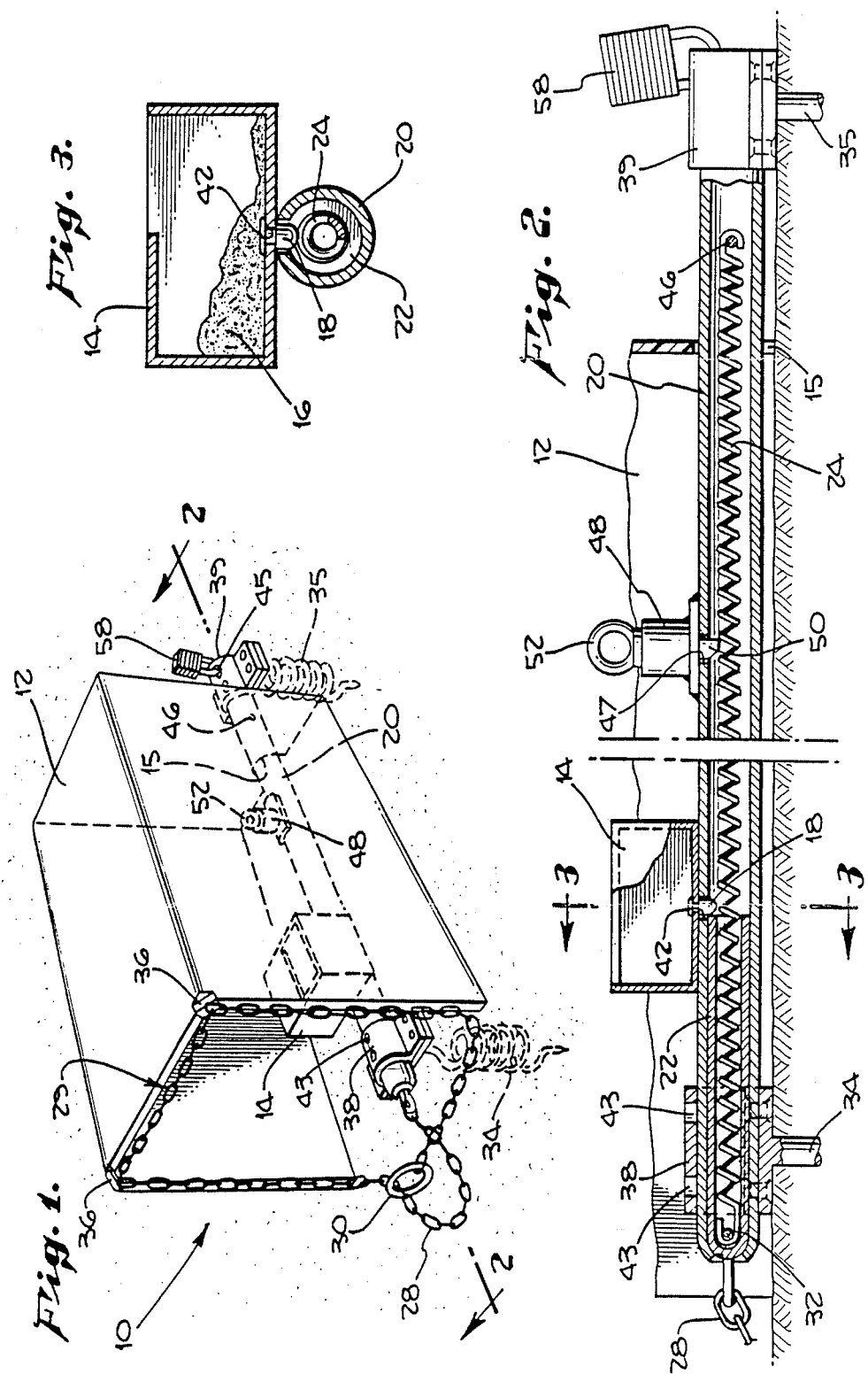

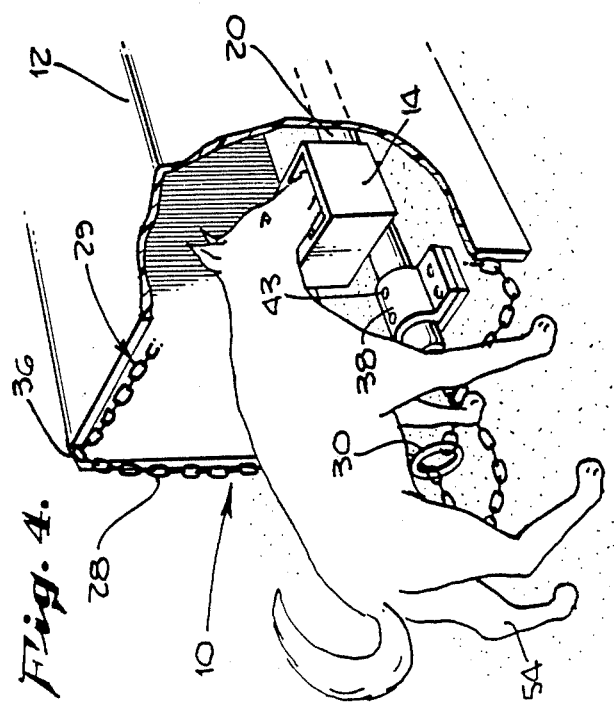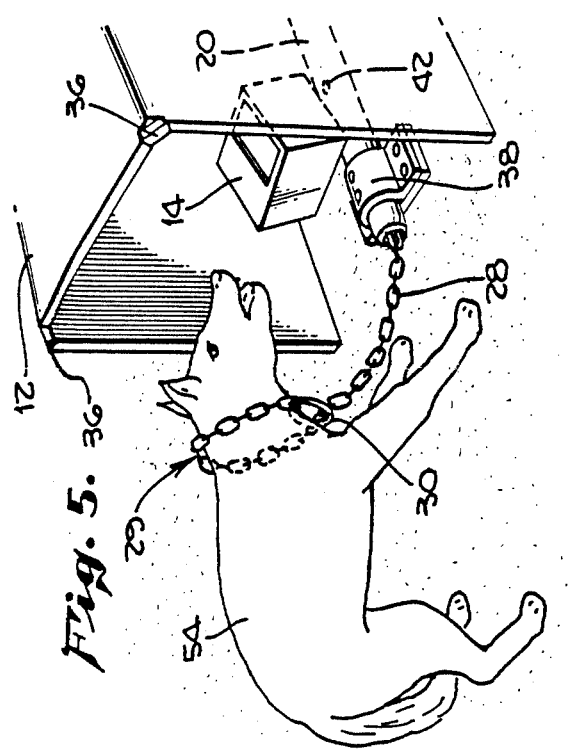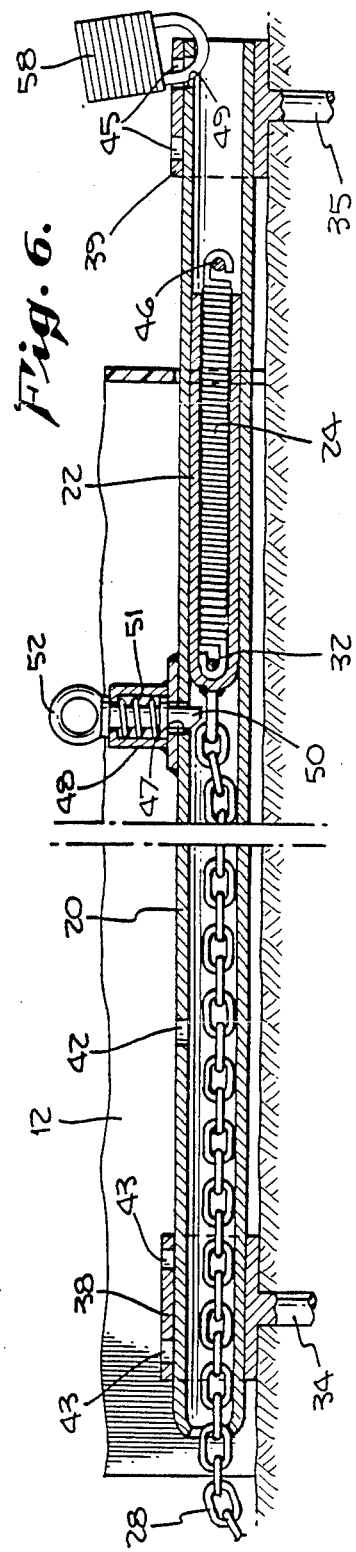

HUMANE ANIMAL CAPTURING AND RESTRAINING DEVICE

BACKGROUND OF THE INVENTION

1. Field of the Invention

This invention relates generally to animal capturing and restraining devices and more particularly to such devices that are designed to effect such capture and such restraint in as humanely a manner as possible. In the practice of the invention as intended, it is highly improbable that a captured animal should be injured either by the action of the device or by the efforts of the animal itself in attempting to free itself.

2. Description of the Related Art

Animal capturing and restraining devices are known in which some attempt has been made to effectuate such capture and restraint in as humanely a manner as possible. While some presently available catch-and-hold devices can bring about an injury free capture, some disadvantages of these prior art devices manifest themselves in the after-capture phase particularly in the cases in which a captured animal attempts to free itself. Many different catch-and-hold devices have been employed in the attempts to solve the problems presented. Most have either presented new problems or only partially solved these problems or both.

In particular, the well-being of the human operator in removing the captured animal from the restraining device has been largely ignored in the design of these prior instrumentalities. For example, an otherwise docile animal may become vicious and fractious because of pain imposed upon it by a mechanism that clamps its leg in a toothed vise or the like. Upon approach by, say, an animal control officer, an animal so maltreated may bite the officer out of the viciousness and frustration born out of the pain attendant to its capture and restraint. As another example, animals captured and restrained by a leg clamp have been known to gnaw off a paw above the clamp in order to gain freedom. A device embodying methods such as these can hardly be called humane nor can it be depicted as efficient, especially in the case in which the animal perfects its escape.

Most of these devices have thus met special needs as presented by specific problems and have, therefore, served narrow purposes. These prior art devices, among other disadvantages, have caused unacceptable pain and suffering to captured animals, either during the procedure of its capture or during the restraint thereafter, have been unreliable and unpredictable in operation under continued use and have been expensive and complicated to manufacture and use. Some of these prior art devices have been described in patents that were brought to the attention of the applicant through a novelty search conducted in the United States Patent and Trademark Office. These patents have been listed in the accompanying INFORMATION DISCLOSURE STATEMENT and PTO-1449.

The U.S. Pat. No. 1,323,400, issued Dec. 2, 1919, to Antoni Lokaj entitled ANIMAL TRAP describes a running noose deployed within a housing and interposed between an animal to be captured and a lure to attract the animal. The trap is designed to snare the animal by means of the running loop and also to close an entry door after the animal has made entrance into the trap. It is significant that the animal to be trapped must first enter the trap completely and then stick its head into the noose in an attempt to reach the lure provided thereafter. It is conceivable that many wary animals would not even enter the almost fully enclosed trap. The running noose, deployed as shown in full view may constitute another indication of danger to an animal to be trapped. FIG. 2 of that patent shows a successfully trapped animal as being suspended by its neck and thus probably throttled. That eventuality can hardly be considered as humane.

The U.S. Pat. No. 1,342,425, issued June 8, 1920, to Felix H. Crago, entitled TRAP, describes a device that is actuated by means of a coiled spring which is triggered by an animal's stepping on a treadle. The described device depends on concealment for its action in capturing an animal since no lure has been provided to attract the animal to the trap. It is apparent that an animal so captured will be captured by a leg or paw. It is known that animals so caught have gnawed the extremity so restrained and amputated it so as to gain freedom. Such an eventuality is sought to be prevented by the advantages of applicant's invention both to prevent the inhumane torture suffered by the animal and to prevent the resultant escape.

The U.S. Pat. No. 1,900,219, issued Mar. 7, 1933 to Vernon Bailey for ANIMAL TRAP purports to provide a trap which will catch and hold an animal securely without mutilation and without inflicting pain and from which the captured animal will not, leaving a paw in the trap, effect escape. Apparently, the noose that is the holding mechanism of the trap will not mutilate the animal's leg, however, it is not immediately obvious how the animal is to be prevented from mutilating its own leg in an attempt to escape. This trap, commendably, does not cause harm to the animal by its operation and thus begins to approach a humane capture and hold action.

The U.S. Pat. No. 4,581,843, issued Apr. 15, 1986 to Alphonse D. Fremont et al for FOOT SNARE LIVE TRAP describes an apparatus that suffers from the same difficulty found in all foot snares, namely, the very real danger that an animal so captured will injure itself in an attempt to gain its freedom. Thus the animal so captured, in addition to mutilating itself, also effects its escape thereby rendering the trap ineffective and inhumane.

It would thus be a great advantage to the art to provide a device capable of capture and restraint of an animal in a safe and humane manner.

Another great advantage would be found in a capturing and restraining device designed so that self inflicted injury to a captured and restrained animal would be most unlikely.

It would be a further desirable advantage to provide such a device in a design that is economical and uncomplicated to manufacture.

A high degree of portability coupled with ease of operation are two added leading advantages sought by the invention.

SUMMARY OF THE INVENTION

It is the purpose of the present invention to provide for the above-stated desired advantages, thus a paramount object of the present invention is to provide a humane animal capturing and restraining device.

It is a further specific object to provide an animal capturing and restraining device that is economical to manufacture.

An additional notable object of the invention is to provide a device embodying the above objects that is easy to operate. A further object of the invention is to provide a high degree of portability such that many such capturing and restraining devices, say, for example, twenty-five or thirty, may be carried in a small truck such as may be employed by animal control officers.

In the accomplishment of these and other objects a Humane Animal Capturing and Restraining Device is provided in which an animal will be attracted to the device by means of a food lure. Upon disturbance of the lure, the animal will be captured by a flexible noose about its neck. The flexible noose will tighten or relax according to the struggles of the animal so captured to free itself, that is, if the animal doesn't struggle, the noose will not tighten; upon cessation of struggle, the noose will relax. Upon such capture, it is improbable that the animal will gnaw off an extremity in an attempt to free itself since the only extremity by which the animal is restrained is its neck and it is well nigh impossible for an animal to bite itself in the neck to the extent necessary to effect its freedom.

A high degree of portability has been accomplished through the expedient of nesting the housing component of the device and providing the additional parts of the structure in forms that may be easily stacked.

BRIEF DESCRIPTION OF THE DRAWINGS

Further advantages and features of the present invention will be more fully apparent to those skilled in the art to which the invention pertains from the ensuing detailed description thereof, regarded in conjunction with the accompanying drawings wherein like reference characters refer to like parts throughout and in which:

FIG. 1 is a perspective view of the Humane Animal Capturing and Restraining Device set up to capture an animal and showing the lure holder in place.

FIG. 2 is a cross sectional view taken along the sight lines 2—2 of FIG. 1 and showing the internal mechanism of the device in the set-to capture configuration.

FIG. 3 is an enlarged cross-sectional view of the lure holder in place taken along the sight lines 3—3 of FIG. 2.

FIG. 4 is a perspective view of the device showing an animal that has been attracted to the lure just before the disturbance thereof.

FIG. 5 is a perspective view showing the flexible noose in place about the animal's neck after disturbance of the lure and the operation of the device to capture.

FIG. 6 is a cross-sectional view of the device after the manner of FIG. 2, however, showing the configuration of the internal mechanism after capture of the animal.

DETAILED DESCRIPTION

Although specific embodiment of the invention will now be described with reference to the drawings, it should be understood that such embodiments are by way of example only and merely illustrative of but a small number of the many possible specific embodiments which can represent applications of the principles of the invention. Various changes and modification, obvious to one skilled in the art to which the invention pertains, are deemed to be within the spirit, scope and contemplation of the invention as further defined in the appended claims.

Referring to FIG. 1 with greater particularity, there is shown a perspective view of the apparatus in its ante capture configuration, set up to effect an animal capture. The interior has been shown in phantom to show the lure holder 14 in position on the outer tube 20. The apparatus is denoted generally by the numeral 10 and the housing 12 is shown in place covering the mechanism. Housing 12 may be of plastic or any other material suitable for the purpose or, alternatively, some already fabricated article such as, for instance, a garbage receptacle with suitable cutouts as at 15, for example, showing a partial hole to accommodate outer tube 20 through the end of housing 12, may be provided. A garbage receptacle type housing is recommended since many animals that are candidates for capture regularly forage in such receptacles and thus are not suspicous of such configurations. In addition, such a receptacle with one side cut out as shown is easily nested with others of its size and shape thus providing ready portability of multiple units and thus fulfilling a principal object of the invention.

Of course, the lure 16, which may be an item of food (FIG. 3), is contained in the lure holder 14 which has a partially open top portion and a closed bottom portion and which is held in place, in the embodiment shown, in the ante capture configuration of the device, on outer tube 20 by means of device setting member 18 at the bottom of holder 14. Device setting member 18 may be a pin that fits into an device setting member receiving slot 42 on outer tube 20 as shown. Outer tube 20 may be securely anchored by means of first and second brackets 38 and 39 which may be identical parts and thus interchangeable, the different identifying numerals merely denoting position. First bracket 38 has first device anchoring means 34 securely fixed thereto as by welding or the like and has two device securing lock holes 50 fabricated therein. As shown, both brackets slip over outer tube 20. Second bracket 39 likewise has second device anchoring means 48 fixed thereto and has the two device securing lock holes 50 fabricated therein. In securing the apparatus in position, for instance, on the ground, outer tube 20 may be used as a lever to screw first one device anchoring means which may be a spiral screw adapted to be secured to the earth by being screwed thereinto, and then the other anchoring means into the ground. Outer tube 20 may then be inserted into the two brackets as shown. The shackle of a padlock may then be inserted through one of the device holes 50 in second bracket 39 and device securing lock hole 49 provided at one end of outer tube 20. FIG. 2. As is obvious, the padlock will prevent translational removal of outer tube 20 while the device of anchoring at both ends prevents the outer tube 20 from being rotated so as to possibly unscrew an anchoring means 34 or 48. Thus no animal. human or otherwise, will be able to easily remove the apparatus without the key to the padlock.

At the near end of the apparatus as viewed in FIG. 1, a slip noose 40 comprising a flexible member, shown here as a metal chain 28, having a large loop 30 is deployed about the mouth 13 of the device and held in place by means of permanent magnets 36, for example. It is recognized, of course, that other means may be employed in the deployment of the flexible member so as to form a slip noose about the mouth or open end of the housing, therefore, the use of the magnet-chain configuration for purposes of illustration is not intended as a limiting factor.

Referring now to FIG. 2, a cross-sectional view of the apparatus is presented to illustrate the mechanism set up for capture, that is, in the ante capture configuration of the device. An inner tube 22 and a resilient member of spring 24 are deployed within outer tube 20. Said resilient member 24 is secured to said inner tube 22 by means of first spring securing means 32 and further secured to said outer tube 20 by means of second spring securing means 26. Resilient member 24, illustrated in this embodiment as a coiled spring, is shown extended and held in such extended configuration by means of device setting member 18 being inserted through device setting member receiving slot 42 in outer tube 20 and held against one end of inner tube 22. An animal, in attempting to reach the lure 16 in lure holder 14, will most certainly disturb device setting member 18 from its position in slot 42 in outer tube 20 as may be seen from a different perspective in FIG. 3.

FIG. 4 shows an animal that has been attracted by the lure 16 just before disturbance of lure holder 14, that is, while the device is still in the ante capture configuration.

FIG. 5 shows the animal after disturbance of the lure holder 14 and that animal's subsequent capture by means of flexible member 28 which has formed slip noose 40 through large loop 30. Device setting member receiving slot 42 is shown after removal of device setting member 18 therefrom caused by disturbance of lure holder 14.

FIG. 6 is a cross-sectional view showing the inner mechanism of the device subsequent to capture of an animal, that is, in its post capture configuration. Resilient member 24 has now been retracted thus drawing inner tube 22 and flexible member or chain 28 to the position shown. Inner tube 22 is now held in position by latching pin 44 in its position in latching pin receiving slot 46 so that the captured animal may not re-extend resilient member 24 by its struggles to free itself. The captured animal is now restrained and held by means of the slip noose 40 formed by flexible member 28 and large loop 30. The slip noose will be tightened or relaxed in direct proportion to the magnitude of the animal's freedom-seeking struggles. Relatively large animals will be captured about the neck while smaller animals will be captured about the body portion between the forelegs and the hind legs. The gnawing off of a body part in the course of struggles for freedom is thus very unlikely. Thus another of the principal objects of the invention has been reached.

Thus, there has been described a Humane Animal Capturing and Restraining Device that will positively yet humanely capture and restrain an animal. Because of the advantages of the apparatus, said captured and restrained animal will be prevented from inflicting freedom-seeking bites upon itself in an attempt to amputate a held body part and will be restrained no more tightly than its own struggles mandate.

Great improvements in portability, reliability, interchangeability of parts, flexibility, maintainability, ease of operation, safety, economy, etc., have been provided in addition to the humane yet positive capture and restraint of animals through the novel advantages of the invention.

It is pointed out that although the present invention has been shown and described with reference to particular embodiment, nevertheless, various changes and modifications, obvious to one skilled in the art to which the invention pertains, are deemed to lie within the purview of the invention.

ABSTRACT OF THE DRAWINGS

In the drawings, the numbers refer to like parts and, for the purpose of explication, set forth below are the numbered parts of the names of the elements of this invention.

| IDENTIFYING NUMERAL | NAME OF ELEMENT | SHOWN IN FIGS. |
|---|---|---|
| 10 | Device generally | 1 |
| 12 | Housing | 1, 4, 5 |
| 13 | Mouth of housing | 1, 4, 5 |
| 14 | Lure holder | 1, 2, 3, 4, 5 |
| 15 | Partial cutout | 1 |
| 16 | Lure or bait | 3 |
| 18 | Device setting member | 2, 3 |
| 20 | Outer tube | 1, 2, 3, 4, 5, 6 |
| 22 | Inner tube | 2, 3, 6 |
| 24 | Resilient member or spring | 2, 6 |
| 26 | Second spring securing means | 2, 6 |
| 28 | Flexible member | 1, 2, 4, 5, 6 |
| 30 | Large loop | 1, 4, 5 |
| 32 | First spring securing means | 2, 6 |
| 34 | First device anchoring means | 1, 2, 6 |
| 36 | Permanent magnets | 1, 5 |
| 38 | First bracket | 1, 2, 4, 5, 6 |
| 39 | Second bracket | 1, 2, 6 |
| 40 | Slip noose | 1, 4, 5 |
| 42 | Device setting member receiving slot | 5, 6 |
| 44 | Latching pin | 2, 6 |
| 46 | Latching pin slot | 2, 6 |
| 48 | Second device anchoring means | 1, 2, 6 |
| 49 | Device securing lock hole | 2, 6 |
| 50 | Bracket device securing lock hole | 1, 2, 6 |

What is claimed and desired to be secured by Letters Patent of the United States is:

1. A humane animal capturing and restraining device, comprising:
    a housing having an opening at least at one end;
    a slip noose formed from an elongated flexible member; means to deploy said slip noose about an open end of said housing;
    an inner tube having one end secured at an end of said flexible member;
    an elongated resilient member inserted in said inner tube and secured at one end to the same end of said inner tube;
    an outer tube slideably containing said inner tube and resilient member, securing said resilient member by its other end;
    a lure holder;
    means employing said lure holder to set said device in its ante capture configuration;
    means to maintain said device in its post capture configuration after capture of an animal; and
    means to anchor said device in its chosen location.
2. The device of claim 1 wherein said housing is a garbage type receptacle in which suitable cutouts have been fabricated.
3. The device of claim 1 wherein said elongated flexible member is a metal chain.
4. The device of claim 1 wherein said elongated resilient member is a coiled spring.

5. The device of claim 1 wherein said means employing said lure holder, comprises:
said lure holder in the form of a container having a partially open top portion and a closed bottom portion;
a device setting member at the bottom of said lure holder;
a device setting member receiving slot in said outer tube;
whereby extension of said resilient member within said outer tube so that said inner tube will have its end that is not secured to said resilient member and said flexible member drawn past said device setting member receiving slot so that said device setting member may be inserted therein so as to constrain said device in its ante capture configuration.

6. The device of claim 1 wherein said means to maintain said device in its post capture configuration, comprises:
a latching pin;
a latching pin receiving slot in said outer tube;
whereby after retraction of said resilient member, said latching pin is adapted to interpose itself at the end of said inner tube that is attached to said resilient member and said flexible member so as to prevent re-extension of said resilient member.

7. The device of claim 1 wherein said means to anchor said device comprises:
a pair of brackets adapted to slideably receive said outer tube, each of which brackets has a pair of bracket device securing lock holes;
device anchoring means fixed to each of said brackets;
a device securing lock hole in one end of said outer tube adapted to be positioned in registry with one of said bracket device securing lock holes in said brackets;
whereby the shackle of a padlock may be inserted through said device securing lock hole and said bracket device securing lock hole when in registry therewith so that said outer tube may be neither translated nor rotated.

8. The device as described in claim 7 wherein said device anchoring means is a spiral screw adapted to be secured to the earth by being screwed thereinto.

9. The method of humanely capturing and restraining an animal comprising the steps of:
selecting an outer tube having apertures adapted to receive a device setting member and a latching pin and having a device securing lock hole fabricated therein;
providing an inner tube slideably inserted in said outer tube;
attaching an elongated flexible member to one end of said inner tube;
inserting a resilient member into said inner tube and securing said resilient member by one of its ends to said one end of said inner tube and by its other end to said outer tube;
providing anchoring means so that said outer tube may be neither rotated nor translated from a fixed position;
selecting a housing member to cover said outer tube;
configuring a slip noose arranged from said elongated flexible member at the mouth of said housing member;
providing a lure holder having a device setting member that may be removably attached to said outer tube through the cooperation of said device setting member receiving slot and said device setting member so as to render said cooperating members in an ante capture configuration;
arranging said cooperating members such that disturbance of said lure holder by an animal to be captured will effect such capture by the cooperating action of said slip noose;
providing a latching pin which in cooperation with said latching pin receiving slot prevents re-extension of said resilient member when retracted so as to render said cooperating members in a post capture configuration.

* * * * *